UNITED STATES PATENT OFFICE.

ELBERT H. ROGERS, OF TUSCALOOSA, ASSIGNOR TO HIMSELF AND C. M. A. ROGERS, OF GAINESVILLE, ALABAMA.

IMPROVEMENT IN PROCESSES OF OBTAINING GUM RESEMBLING INDIA RUBBER.

Specification forming part of Letters Patent No. 136,765, dated March 11, 1873.

*To all whom it may concern:*

Be it known that I, Dr. ELBERT H. ROGERS, of Tuscaloosa, in the county of Tuscaloosa and State of Alabama, have invented a new and Improved Substitute for India Rubber; and I do hereby declare the following to be a full, clear, and exact description of the same.

The invention relates to substances which are elastic, water-proof, and susceptible of vulcanization, and which may be generally embraced under the term rubber. The specific names of the substances now used for this purpose are caoutchouc and gutta-percha. The sources from which the former has been derived are the urceola, ficus, and sphonia tree or shrub of South America; and those from which the latter has been obtained are the gum-trees of the Malayan Archipelago. Both of these specific substances consist of the sap of the plant, secured by incising the bark and allowing it to exude.

I have discovered that a substance similar in its essential properties is contained within a wild berry, locally known as the bamboo-berry, and growing in States that border upon the Gulf of Mexico. The substance not only does not consist of the sap of the plant, as do other rubbers heretofore known, but not even of the juice of the berry. The crude substance is found in a solid form, and consists of the pulp of the fruit, which grows upon a vine, and is very prolific. There are several varieties of this vine, which produce berries varying in size, number of seeds, and probably other distinctive features which have escaped my observation; but they are all found by me, after careful experiment, to furnish a pulp having the same essential general properties.

The first objects are to express the juice and separate the hull. These are accomplished by pressing, rolling, or pounding the fruit, which is subsequently washed and dried. It is then passed through a grinding-mill, which effectually destroys the cohesion of the hull, pulp, and seed, and allows them to be easily separated by a fan. The dry pulp, being of less specific gravity than either the stones or the skins, is blown out into a sheet or other receptacle prepared to receive it. The pulp is now disintegrated in chloroform, some essential oil, or other equivalent solvent. The product is a viscous fluid, adapted to all the purposes which are subserved by the best of rubbers.

It has been experimentally applied for making bands, shoes, and clothing, and has been vulcanized without any difficulty whatever.

I have been experimenting upon this invention for the last four years, and have cultivated with success the vine which produces the berry.

The local name of bamboo is doubtless a misnomer, since this vine has no analogy to the family of bamboos or reeds; but, as I am unaware of its botanic name, I have no other means of identifying it.

I am satisfied that it will produce under cultivation a large acreable product of berries, and that its product of excellent wine will alone make it a profitable crop. Hence, there will be every inducement to farmers to go largely into the cultivation of this rubber-vine, and thus greatly cheapen the present cost of rubber to the public.

I am aware that no patent could issue merely upon the discovery of the berry, and also that attempts have been made before to utilize the greenbrier and, perhaps, other berries for this purpose. Hitherto, however, no process has been discovered capable of returning a product which would pay for the expense of manufacture. My process, having been well tried, is found to be eminently practicable and profitable.

Having thus described my invention, what I claim as new, and desire to secure by Letters Patent, is—

The process of obtaining rubber-pulp from bamboo and other berries by first expressing the juice; secondly, drying the hull, pulp, and seed in a mass; thirdly, disintegrating said pulp, hull, and seed by trituration; and, finally, separating the pulp therefrom by a fan; all substantially as described.

E. H. ROGERS.

Witnesses:
SOLON C. KEMON,
THOS. D. D. OURAND.